United States Patent [19]

Furuta et al.

[11] 3,959,441

[45] May 25, 1976

[54] DESULFURIZATION PROCESS

[75] Inventors: Isao Furuta, Mitaka; Kazuhito Yagaki; Toshihiko Masuda, both of Kobe, all of Japan

[73] Assignee: Kobe Steel, Ltd., Kobe, Japan

[22] Filed: Jan. 7, 1974

[21] Appl. No.: 431,158

[30] Foreign Application Priority Data

Aug. 3, 1973 Japan............................... 48-87813

[52] U.S. Cl.............................. 423/242; 423/512 A; 423/166
[51] Int. Cl.² ........................................ C01B 17/00
[58] Field of Search ........................... 423/242–244, 423/166, 167, 512

[56] References Cited
UNITED STATES PATENTS 3,386,798 1/1968 Bevans et al........................ 423/242
3,632,306 1/1972 Villiers-Fisher et al. ........... 423/242

FOREIGN PATENTS OR APPLICATIONS 1,361 5/1941 Switzerland........................ 423/242
378,464 8/1932 United Kingdom................. 423/242

*Primary Examiner*—Oscar R. Vertiz
*Assistant Examiner*—Gregory A. Heller
*Attorney, Agent, or Firm*—Oblon, Fisher, Spivak, McClelland & Maier

[57] ABSTRACT

Sulphur dioxide is removed from a stack gas by bringing said gas containing $SO_2$ into contact with an absorbing solution prepared by adding an hydroxide of a metal from either Groups II, III and VIII of the periodic Table to an aqueous solution of a halide of said metal, wherein the hydroxide is present in an amount of from 0.3 to 0.8 weight percent.

9 Claims, 5 Drawing Figures

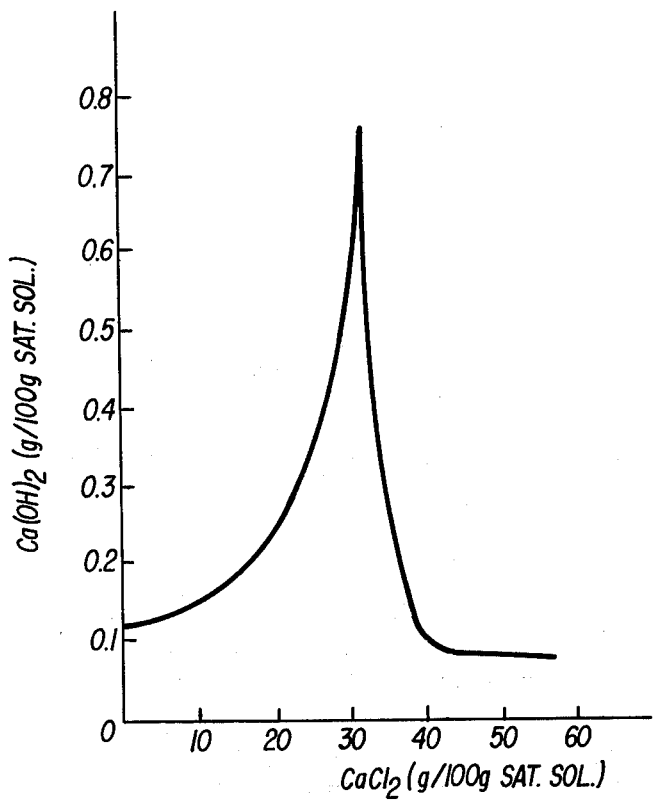
FIG. 1
FIG. 2
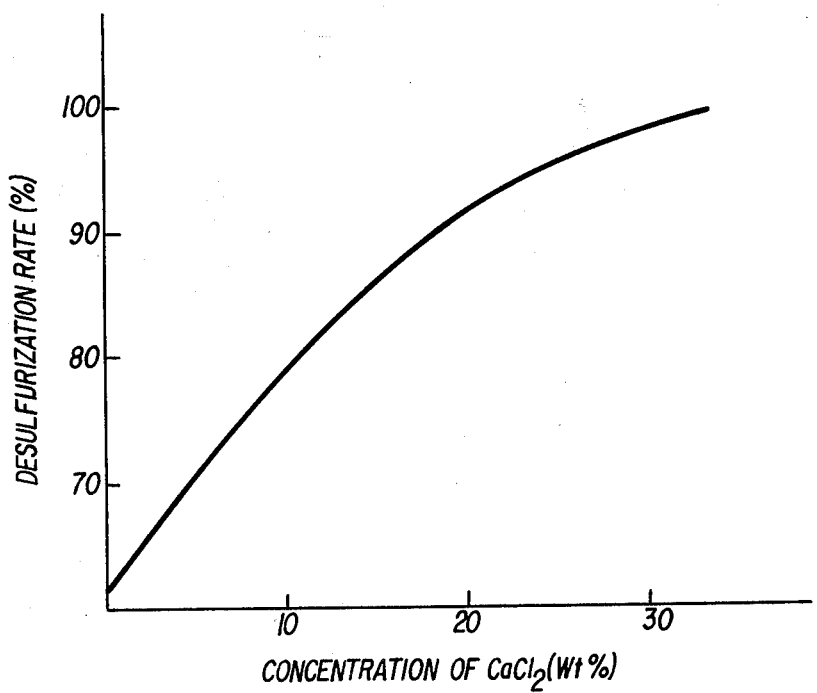

DESULFURIZATION PROCESS

BACKGROUND OF THE INVENTION

1. Field of the Invention

This invention relates to the removal of gases such as sulfur dioxide from the stack exhaust gas.

2. Description of the Prior Art

It is known to use a solution which has been prepared by adding a hydroxide of a metal from either Groups II, III and VIII of the Periodic Table to an aqueous solution of a halide of said metal for the purpose of removing $SO_2$ from an exhaust gas containing $SO_2$. More specifically, U.S. Pat. No. 3,386,798 discloses that when an aqueous solution containing 40 to 42.5% calcium-chloride (which will be referred to as $CaCl_2$) is brought into contact with a stack gas containing $SO_2$ therein, and thereafter about 0.0013% calcium hydroxide (which will be referred to as $Ca(OH)_2$ hereinafter) is added to the aforesaid aqueous solution, $SO_2$ is removed from the stack gas. According to the process disclosed therein, $CaCl_2$ serves to remove $SO_2$ by reacting with the same, while the $Ca(OH)_2$ is added to the $CaCl_2$ solution which has contacted the gas containing $SO_2$ to neutralize or render the $CaCl_2$ solution weakly alkaline thereby regenerating $CaCl_2$ therefrom.

However, the patent contains no description as to whether the $Ca(OH)_2$ is contained in the absorbing solution prior to its contact with the stack gas containing $SO_2$ absorbing solution. In such a conventional process, even if $Ca(OH)_2$ is contained in the absorbing solution prior to its contact with the exhaust gas containing $SO_2$ there remains the problem that the solubility of $Ca(OH)_2$ in the absorbing solution is limited and as a result, the absorbing capacity for absorbing $SO_2$, of the absorbing solution per unit quantity will be reduced. Therefore, a need arises to increase the size of the tower in which the stack (exhaust) gas is brought into contact with the absorbing solution, as well as in the amount of the absorbing solution to be used.

In addition, a lime slurry process is known in which an absorbing solution consisting of an aqueous solution of $Ca(OH)_2$ is used. However, this process suffers from the following disadvantages:

1. Due to the lower solubility of $Ca(OH)_2$ in the aqueous absorbing solution, the $Ca(OH)_2$ has to be in a slurry state when it is used, thus causing problems such as clogging during its circulation.

2. Difficulties are encountered when the $CaSO_3$ which has been precipitated due to the absorption of $SO_2$ by the absorbing solution is converted to $CaSO_4$ and this conversion requires that $H_2SO_4$ is used to adjust the pH and requires heating and oxidation leading to a costly process.

3. Difficulties are also encountered with the separation of $CaSO_3$ from the absorbing solution in the slurry state, and it is particularly impossible to separate the $CaSO_3$ from the absorbing solution in the conventional lime-gypsum process, unless the resultant encompassed or enclosed condition of the $Ca(OH)_2$ by the $CaSO_3$ is eliminated, this encompassed condition (encapsulating) being created by the formation of $CaSO_3$ around the $Ca(OH)_2$ due to the use of the $Ca(OH)_2$ in the slurry state as an absorbing solution. In this respect, the solubility of the hydroxides of these metals in water such as for example, that of $Ca(OH)_2$ is extremely low, so low that the hydroxides are present in a slurry state when mixed with water. The low solubilities of the hydroxides not only decrease the absorbing rate of $SO_2$ gas, but also result in difficulties in the separation of the absorbed $SO_2$ from the compounds of those metals, such as $CaSO_3$ or $CaSO_4$.

For example, in the case of calcium, the absorbing solution is present in the slurry state in which there is formed $CaSO_3$ or $CaSO_4$ that tends to encapsulate the $Ca(OH)_3$ (which is the alkaline source). This would not permit separation of the $CaSO_3$ or $CaSO_4$ from the $Ca(OH)_2$, i.e., the alkali source is eliminated unless the encapsulated condition of the $Ca(OH)_2$ with $CaSO_3$ or $CaSO_4$ is eliminated. This then necessarily causes a certain amount of alkali-loss.

Furthermore, once the absorbing solution reacts with any $CO_2$ present, the absorbing solution loses absorbing capacity to a degree corresponding to the amount of the absorbing solution consumed in the aforesaid reaction. It is however a general tendency that the absorbing solution will readily absorb $CO_2$ and thus it is difficult to improve the $SO_2$ absorbing capability of an absorbing solution. A need therefore exists for a $SO_2$ absorbing process and solution which is not present in a slurry state and does not suffer from the aforementioned disadvantages.

SUMMARY OF THE INVENTION

Accordingly, one object of this invention is to provide an efficient desulfurization process which utilizes an absorbing solution that exhibits a high absorbing capacity for $SO_2$ rather than $CO_2$ and $SO_2$ is selectively absorbed by the solution.

Another object of this invention is to provide an absorbing solution which is in a clarified or clear state rather than a slurry state.

Another object of the invention is to provide an efficient desulfurization process in which an absorbing solution is used in which a relatively large amount of a hydroxide of a metal from either Groups II, III and VIII of the Periodic Table is dissolved in an aqueous solution of a halide of said metal.

Yet another object of the invention is to provide an efficient desulfurization process which provides means for effectively bringing the absorbing solution into contact with the stack gas containing $SO_2$ therein.

Yet another object of the invention is to provide an efficient desulfurization process which provides means for effectively circulating the absorbing solution while enabling the removal of nitrogen oxides if contained in the stack gas.

A still further object of the present invention is to also remove $NO_x$ if contained in the $SO_2$-containing stack gas by contact of the gas containing $SO_2$ and $NO_x$ (oxides of nitrogen) with the aforesaid absorbing solution.

Another object of the invention is to further increase the effectiveness of $SO_2$ removal by having oxygen contained in the gas containing $SO_2$ before being treated with the absorbing solution or by treating the absorbing solution with oxygen prior to contact of the absorbing solution with the $SO_2$-containing gas to be treated.

Briefly, these and other objects of the invention as hereinafter will be apparent are achieved by providing a desulfurization process in which the gas containing $SO_2$ is brought into contact with an absorbing solution containing 25 to 33% by weight of a halide of a metal from either Groups II, III and VIII of the Periodic Table and 0.3 to 0.8% by weight of a hydroxide of the same metal thereby removing $SO_2$ from stack gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 1 is a plot showing the relationship between the solubility of $Ca(OH)_2$ and the concentration of $CaCl_2$, FIG. 2 is a plot showing the variation in the rate of desulfurization with respect to the concentration of $CaCl_2$.

DETAILED DESCRIPTION OF THE PREFERRED EMBODIMENTS

Figure 3:
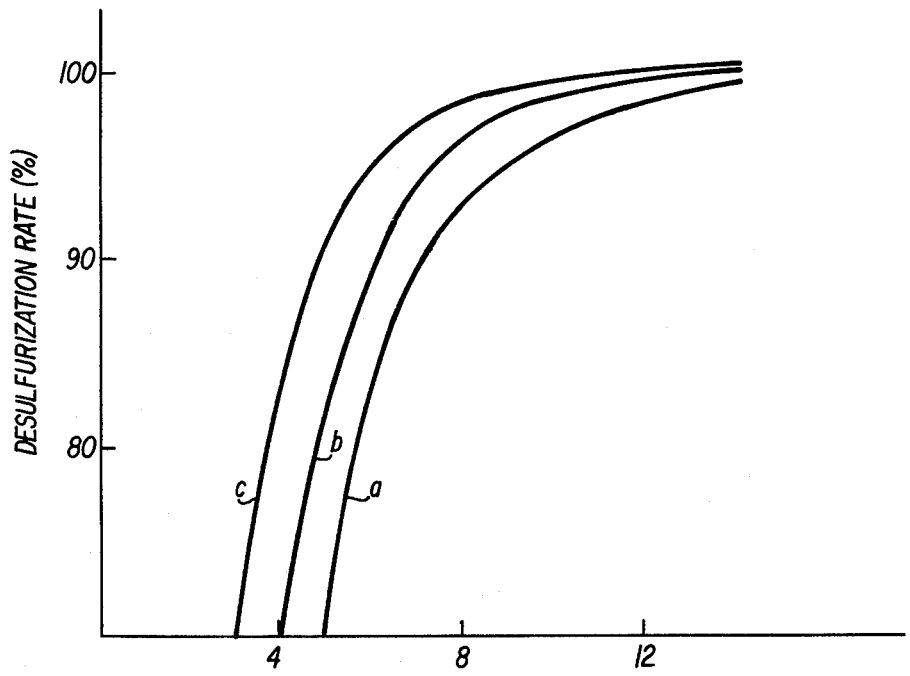
FIG. 3 is a plot showing the relationship between the pH of the absorbing solution to the desulfurization rate.

According to the present invention, an aqueous solution which contains 25 to 33% by weight of a halide of a metal from either Groups II, III or VIII of the periodic table and 0.3 to 0.8% by weight of a hydroxide of said metal, is used as a $SO_2$ absorbing solution. Such halides are, for instance, $CaX_2$, $MgX_2$, $ZnX_2$, $BaX_2$, $AlX_n$, $FeX_n$, $NiX_2$, or the like (X represents a halogen such as chloride, fluoride, bromide or iodide, although chloride is preferred). The hydroxides of these metals which may be employed in the present invention include $Ca(OH)_2$, $Mg(OH)_2$, $Zn(OH)_2$, $Ba(OH)_2$, $Al(OH)_n$, $Fe(OH)_n$, $Ni(OH)_2$ or the like. When the halide is used in an amount of from 25 to 33% by weight and the hydroxide is used in an amount of from 0.3 to 0.8% by weight in the aqueous solution, the hydroxides of these metals exhibit an extremely high solubility in the resultant absorbing solution. When the solution is maintained at a temperature of from 5° to 75°C a clear solution rather than a slurry state solution is obtained.

For example, when $CaCl_2$ is used as the metal halide and $Ca(OH)_2$ is used as the metallic hydroxide the solubility of the $Ca(OH)_2$ may be increased from 6 to 7 times as compared with the conventional absorbing solution containing $Ca(OH)_2$ alone, and the absorbing solution is in a clarified state that avoids such disadvantages as clogging in the treatment as associated with the conventional solutions.

Preferably, calcium hydroxide or magnesium hydroxide is added to the aqueous solution containing from about 27.8 to about 32.5% of the chloride of the metal until the maximum solubility thereof is reached to produce the desired absorbing solution for $SO_2$ absorption. The thus-prepared solution is brought into contact with a stack gas containing $SO_2$ for desulfurization, with the attendant appreciable decrease in alkali-loss and increase in absorbing rate.

Having generally described this invention, a further understanding can be obtained by reference to certain specific examples, which are included for purposes of illustration only and are not intended to be limiting unless otherwise specified.

EXAMPLE $CaCl_2$ is used as the metal halide although the same description may apply to other metallic halides. As can be seen from the plot shown in FIG. 1, the solubility of $Ca(OH)_2$ varies to a great degree depending on the varying concentration of $CaCl_2$, and thus the solubility of $Ca(OH)_2$ at a temperature of 40°C will be increased 6 to 7 times as high as the conventional concentration of $Ca(OH)_2$ when the concentration of $CaCl_2$ is 30% (30% by weight $CaCl_2$ is dissolved in 100% by weight of solvent).

FIG. 2 shows the desulfurization rate at varying concentrations of $CaCl_2$ when a relatively large amount of $Ca(OH)_2$ such as of over 0.8% by weight, is present in the absorbing solution. It can be seen from FIG. 2 that the desulfurization rate will increase with the increase in the amount of $CaCl_2$ until the concentration of the $CaCl_2$ reaches 30% by weight.

FIG. 3 shows the relationship between the pH of an absorbing solution prior to contact with the stack gas and the desulfurization rate under the same condition as that shown in FIG. 2. In FIG. 3, line $a$ denotes a desulfurization rate at the concentration of $CaCl_2$ of 5% by weight, line $b$ denotes a desulfurization rate at a concentration of $CaCl_2$ of 15% by weight, and line $c$ refers to a concentration of $CaCl_2$ of 30% by weight. As can be seen from FIG. 3, the greater the concentration of $CaCl_2$, the higher the desulfurization rate of a wide pH range. As a result of the contact of the absorbing solution with a stack gas containing $SO_2$, $CaSO_2.2H_2O$ or $CaSO_3$ ½$H_2O$ is formed in the absorbing solution.

As is apparent from FIGS. 1 to 3, a clear absorbing solution in which a sufficient amount of metallic hydroxide serving as an alkali source is dissolved, is brought into contact with a stack gas the thus $SO_2$ may be removed at a high desulfurization rate, while the solid matter produced thereby may be readily separated from the absorbing solution, thus enabling regeneration of a clarified or clear absorbing solution.

Figure 4:
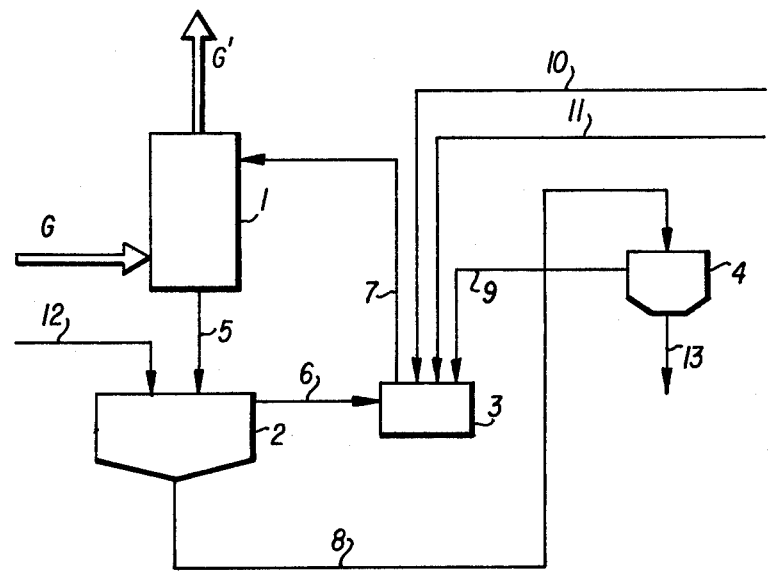
FIG. 4 is a schematic view of one embodiment of the invention.

FIG. 4 shows one example of a flow sheet of the desulfurization process of this invention. Shown at 1 is a stack gas cleaning tower, at 2 a thickener, at 3 an alkali-circulating tank, and at 4 a filter or centrifugal separator. The cleaning tower 1, thickener 2 and alkali-circulating tank 3 constitute a closed circuit with the aid of conduits 5, 6 and 7, in such a manner so that the solution may circulate in the order of components appearing as shown. The thickener 2 communicates through a conduit 8 with the centrifugal separator 4, which in turn is in communication through a conduit 9 with the alkali circulating tank 3. Connected to the alkali circulating tank are a conduit 10, through which alkali source is supplied for maintaining the alkali concentration constant, and a conduit 11 for supplementing loss of $CaCl_2$. Connected to the thickener 2 is a conduit for supplying a flocculant which will be described in detail hereinafter. Thus, a stack gas G containing $SO_2$ is introduced, as shown by an arrow, into the cleaning tower 1, wherein the stack gas is contacted and cleaned with a clear absorbing solution prepared by dissolving alkali hydroxide into a solvent of an aqueous solution of calcium chloride, so that the $SO_2$ contained in the stack gas may be absorbed in the solution, and then the stack gas is discharged as a clear gas G' externally. The $SO_2$ thus removed or separated assumes the form of $CaSO_3$ in the clear absorbing solution and is extracted through conduit 5 into thickener 2, while the solid matter, $CaSO_3$, contained in the solution will be precipitated in a satisfactory manner with a flocculant added through conduit 12 to the solution, because the amount of the aforesaid solid matter is significantly small. It is preferably that a high molecular anion base flocculant be used in amounts of from 0.2 ppm to 0.3 ppm.

Although the conventional slurry process uses the addition of a flocculant for the purpose of enhancing the precipitation, $Ca(OH)_2$ which has been added to the $CaCl_2$-aqueous solution in an amount exceeding the solubility of $Ca(OH)_2$ in the aforesaid aqueous solution, presents a solid form and is precipitated together with $CaSO_3$. Accordingly, the addition of the flocculant is advantageous only in the process using the circulation of a clear absorbing solution.

The solid matter, $CaSO_3$, which has been precipitation-separated in the thickener 2 due to the addition of the flocculant, is then extracted through conduit 8 and fed to a solid-matter separator, i.e., a filter or centrifugal separator 4, wherein the solid matter may be separated from solution. In this respect, the solid matter consisting essentially of $CaSO_3$ is extracted through conduit 13 from the centrifugal separator 4 out of the system, while the clear absorbing solution, that is to say, the supernatant liquid in the centrifugal separator 4 is fed through conduit 9 to the alkali-circulating tank 3, with no solid matter being contained therein. On the other hand, the supernatant liquid in the thickener contains no solid matter and is fed through conduit 6 to the alkali-circulating tank 3. The supply of alkali source and the supplementing of $CaCl_2$ is carried out through conduits 10 and 11 for maintaining the alkali-concentration constant and for supplementing the loss of $CaCl_2$, respectively. The clear absorbing solution thus collected in the alkali-circulating tank 3 is then fed through conduit 7 to the cleaning tower for cleaning the stack gas G.

Figure 5:
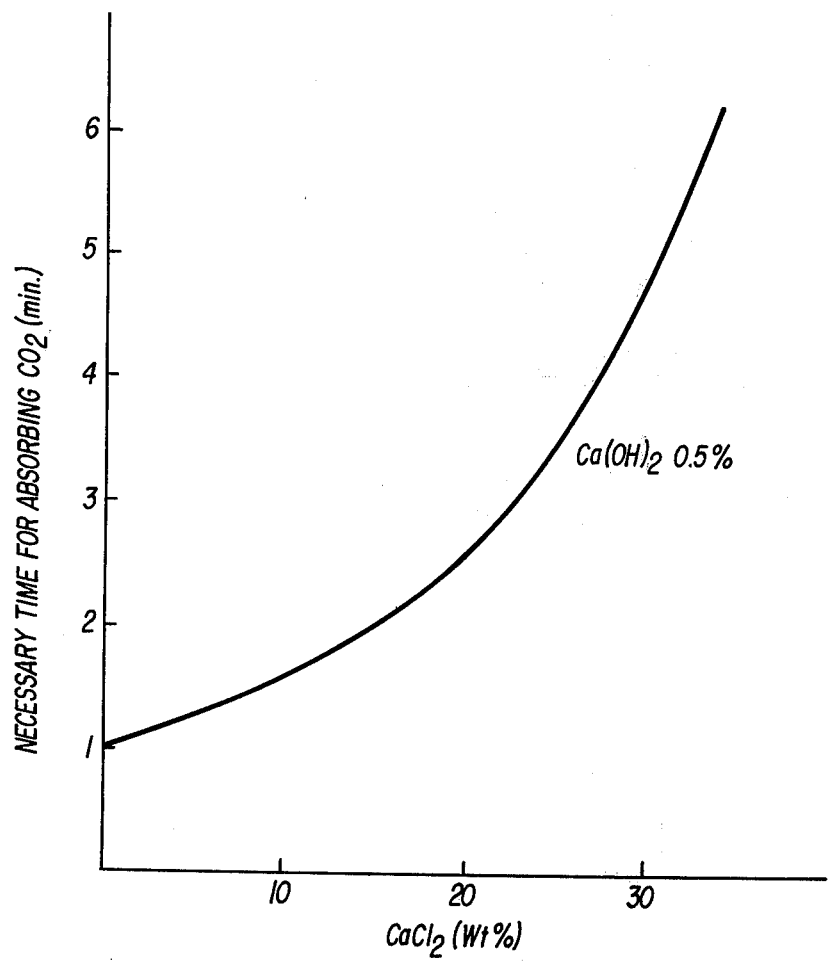
FIG. 5 is a plot showing the relationship of the absorbability of $CO_2$ with respect to the concentration of $CaCl_2$.

FIG. 5 shows the relationship between the time needed to absorb $CO_2$ in relation to the amount of $CaCl_2$ mixed with 0.5% by weight of $Ca(OH)_2$.

Desulfurization treatments were applied to the stack gas from a boiler which was operated under conditions in which the gas flow rate was 1000 $Nm^3/hr$, the gas temperature of 70°C and the concentration of $SO_2$ in the gas was 1500 ppm. The following table lists the result of comparisons of several examples according to the present invention with those of the conventional process, i.e., lime-gypsum process.

| | pH of absorbing solution | Liquid-to gas ratio | $Ca(OH)_2$ alkali in solid matter separated | Concentration of $SO_2$ gas after treatment |
|---|---|---|---|---|
| Present invention | max 9.5 | 0.5–3 | 0.2%/$CaSO_3$ | 100–50 |
| Prior art | max 12.0 | 1–6 | 10–30%/$SaSO_3$ | 250-100 |

The advantages of the present invention are as follows:

1. Since the absorbing solution is provided in a clarified or clear state rather than in a slurry state, it will not clog the various conduits and apparatus used.

2. Since the $CO_2$ absorbing capacity of the absorbing solution may be reduced by means of $CaCl_2$, the reduction in the $SO_2$ absorbing capacity of the absorbing solution due to absorption of $CO_2$ is minimized, and hence a high level of desulfurization for $SO_2$ is obtained.

3. The solid matter may be readily separated from the solution which has contacted the stack gas containing $SO_2$ so that the solution may be readily regenerated as a clear absorbing solution.

4. Since the capacity for absorbing $SO_2$ of the absorbing solution per unit amount of solution is large, the total amount of the absorbing solution used may be minimized.

5. As compared with the conventional lime-gypsum process, the process of the present invention presents a higher desulfurization rate at the same pH, and permits the stack gas treatment on the acid side at the same desulfurization rate.

6. Nitrogen oxide may be removed.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for the desulfurization of gases containing sulfur dioxide which comprises the steps of:
   A. contacting said gases containing sulfur dioxide with an aqueous absorbing solution containing 25–33% by weight alkaline earth metal halide and 0.3 – 0.8% by weight hydroxide of said alkaline earth metal wherein the sulfur dioxide assumes the form of a solid alkaline earth metal sulfite; and
   B. separating said solid alkaline earth metal sulfite from said aqueous absorbing solution.

2. The desulfurization process of claim 1 wherein the gas containing $SO_2$ is mixed with oxygen beforehand and then the gas thus mixed is brought into contact with the absorbing solution maintained at 5° to 75°C.

3. The desulfurization process of claim 1, wherein the absorbing solution is treated with oxygen beforehand, and then brought into contact with the gas containing $SO_2$ therein.

4. The desulfurization process of claim 1, wherein said absorbing solution contains from 27.8 to 32.5% by weight halide.

5. The desulfurization process of claim 1, wherein said halide of a metal is a chloride of calcium or magnesium.

6. The desulfurization process of claim 5, wherein said halide of a metal is calcium chloride.

7. The desulfurization process of claim 1, wherein said absorbing solution is circulated through a cleaning tower, thickener and alkali-circulating tank in order, and then the mixture of liquid containing solid matter obtained in said thickener is separated into solid and liquid fractions in a solid liquid separator, while the liquid thus separated is introduced into said alkali-circulating tank.

8. The desulfurization process of claim 7, wherein the hydroxide of said metal is added to the alkali-circulating tank.

9. The desulfurization process of claim 7 wherein 0.2 to 0.3 ppm of a high molecular weight anion base flocculant is added into said thickener.

* * * * *